US012496530B2

(12) United States Patent
Eatman et al.

(10) Patent No.: US 12,496,530 B2
(45) **Date of Patent: *Dec. 16, 2025**

(54) OVERHEAD DISPLAY HAVING CONCENTRIC INNER AND OUTER DISPLAYS AND ASSOCIATED SYSTEMS AND METHODS

(71) Applicant: Aristocrat Technologies Australia Pty Limited, North Ryde (AU)

(72) Inventors: Reginna Eatman, Las Vegas, NV (US); Rena Schoonmaker, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 110 days.

This patent is subject to a terminal disclaimer.

(21) Appl. No.: 18/204,755

(22) Filed: Jun. 1, 2023

(65) Prior Publication Data

US 2023/0302371 A1 Sep. 28, 2023

Related U.S. Application Data

(63) Continuation of application No. 17/205,786, filed on Mar. 18, 2021, now Pat. No. 11,701,594, which is a continuation-in-part of application No. 16/385,976, filed on Apr. 16, 2019, now Pat. No. 10,984,627.

(51) Int. Cl.

| | |
|---|---|
| ***A63F 13/90*** | (2014.01) |
| ***F16M 11/26*** | (2006.01) |
| ***G07F 17/32*** | (2006.01) |

(52) U.S. Cl.

CPC ............. *A63F 13/90* (2014.09); *F16M 11/26* (2013.01); *G07F 17/3211* (2013.01); *G07F 17/3216* (2013.01); *A63F 2300/8023* (2013.01)

(58) Field of Classification Search

CPC .......................... G07F 17/3211; G07F 17/3276

See application file for complete search history.

(56) References Cited

U.S. PATENT DOCUMENTS

| | | | | |
|---|---|---|---|---|
| 2,830,395 | A | 4/1958 | Hutchens | |
| 3,340,633 | A | 9/1967 | Silberman | |
| 6,434,806 | B1 * | 8/2002 | Walt, II .................... | B68G 7/05 29/91.8 |
| 6,578,301 | B1 | 6/2003 | Ericson | |

(Continued)

OTHER PUBLICATIONS

Notice of Allowance dated Oct. 28, 2020 for U.S. Appl. No. 16/385,976 (pp. 1-5).

(Continued)

*Primary Examiner* — Yingchuan Zhang

(74) *Attorney, Agent, or Firm* — Armstrong Teasdale LLP

(57) ABSTRACT

A method for assembling an overhead display assembly includes providing a plurality of display segments, each display segment of the plurality of display segments configured to mate with at least one other display segment. The method also includes coupling each display segment to a support stanchion of a plurality of support stanchions and coupling a first display segment to a second display segment to form the display assembly. The display assembly is then raised on the plurality of support stanchions, after coupling the first display segment to the second display segment. The display assembly is also coupled in communication with an electronic gaming machine.

18 Claims, 13 Drawing Sheets

(56) References Cited

U.S. PATENT DOCUMENTS

| | | | | |
|---|---|---|---|---|
| D582,985 | S | 12/2008 | Tanaka | |
| 8,256,151 | B2 | 9/2012 | Stafford | |
| D681,263 | S | 4/2013 | Van Eekeren | |
| D714,875 | S | 10/2014 | Wudtke | |
| 8,894,487 | B2 | 11/2014 | Granger | |
| 9,245,411 | B2 * | 1/2016 | Vann | G07F 17/3244 |
| D769,985 | S | 10/2016 | Roberts | |
| 9,659,434 | B2 | 5/2017 | Bainbridge | |
| 9,679,435 | B2 | 6/2017 | Schrementi | |
| D843,482 | S | 3/2019 | Holland | |
| D859,335 | S | 9/2019 | D'Ambrosio | |
| D866,667 | S | 11/2019 | Stair | |
| 10,565,831 | B2 | 2/2020 | Bolling, Jr. | |
| D880,605 | S | 4/2020 | Bussey | |
| D882,699 | S | 4/2020 | Bernard | |
| 10,629,032 | B2 | 4/2020 | Hawkins | |
| D883,393 | S | 5/2020 | Bernard | |
| D891,520 | S | 7/2020 | Urban | |
| D906,155 | S | 12/2020 | Freiberg | |
| D908,653 | S | 1/2021 | Eatman | |
| D910,762 | S | 2/2021 | Demarco | |
| D914,807 | S | 3/2021 | Olive | |
| D916,969 | S | 4/2021 | Fleming, Jr. | |
| D934,346 | S | 10/2021 | Olive | |
| 2005/0174302 | A1 | 8/2005 | Ishii | |
| 2006/0046818 | A1 | 3/2006 | Goins | |
| 2007/0033847 | A1 | 2/2007 | Tanaka | |
| 2008/0067312 | A1 | 3/2008 | Allen | |
| 2012/0206925 | A1 | 8/2012 | Shenk | |
| 2013/0116809 | A1 | 5/2013 | Carpenter | |
| 2014/0326022 | A1 | 11/2014 | Tosyali | |
| 2014/0342825 | A1 | 11/2014 | Schrementi | |
| 2015/0264339 | A1 * | 9/2015 | Riedel | H04N 13/383 348/54 |
| 2017/0038928 | A1 | 2/2017 | Park | |
| 2017/0058918 | A1 * | 3/2017 | Maro | A01C 7/205 |
| 2017/0345250 | A1 | 11/2017 | Pececnik | |
| 2017/0358176 | A1 | 12/2017 | Carpenter | |
| 2019/0056762 | A1 | 2/2019 | Azam | |
| 2019/0320543 | A1 * | 10/2019 | Wand | G07F 17/3211 |

OTHER PUBLICATIONS

"Circular led screen, LED Display working and testing" Apr. 25, 2016, site visited Dec. 14, 2021: https://youtu.be/S-EDS7TCzmA (Year: 2016).

"Adnoc led screen Round Circular LED Display Screen—Circular Ticker LED Screen" Oct. 2, 2018, site visited Dec. 14, 2021: https://youtu.be/4Wzz9XVqYJQ (Year: 2018).

"Bigabox Circular LED video screens" Oct. 26, 2017, site visited Dec. 14, 2021: https://youtu.be/OO2WK08xEo0 (Year: 2017).

Office Action dated Jan. 3, 2022 for U.S. Appl. No. 29/670,202 (pp. 1-10).

Paltronics Australia—https://www.paltronics.com.au/jackpot-link/led-displays/, date unknown, 1 page.

Shenzhen DGX Technology Co., Ltd.—https://www.youtube.com/watch?v=S-EDS7TCzmA and www.szgdx.com, dated Apr. 25, 2016, 1 page.

Gamecraft—http://www.game-craft.com.au/gen-1-signage-hardware/ printed on Apr. 4, 2022, 4 pages.

Office Action (Non-Final Rejection) dated Sep. 29, 2022 for U.S. Appl. No. 17/205,786 (pp. 1-11).

Notice of Allowance dated Jan. 17, 2023 for U.S. Appl. No. 29/670,202 (pp. 1-7).

Office Action (Notice of Allowance and Fees Due (PTOL-85)) dated Mar. 2, 2023 for U.S. Appl. No. 17/205,786 (pp. 1-5).

Office Action dated Jun. 5, 2020 for U.S. Appl. No. 16/385,976 (pp. 1-11).

Australian Examination Report No. 1 issued in App. No. 2020202582 dated Jan. 22, 2025, 4 pages.

* cited by examiner

OVERHEAD DISPLAY HAVING CONCENTRIC INNER AND OUTER DISPLAYS AND ASSOCIATED SYSTEMS AND METHODS

CROSS REFERENCE TO RELATED APPLICATIONS

This application is a continuation of, and claims priority to, U.S. patent application Ser. No. 17/205,786, filed Mar. 18, 2021, which is a continuation-in-part of, and claims priority to, U.S. patent application Ser. No. 16/385,976, filed Apr. 16, 2019, the contents of which are hereby incorporated by reference in their entireties.

TECHNICAL FIELD

The field of disclosure relates generally to electronic gaming, and more particularly, to an overhead display configured to be mounted over a bank of electronic gaming machines, where the overhead display may be networked with the bank of electronic gaming machines and includes concentric inner and outer displays for displaying a variety of content from the bank of electronic gaming machines.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

In one aspect, an overhead display configured to be mounted over one or more electronic gaming machines is provided. The overhead display includes a plurality of display segments, where each display segment of the plurality of display segments is configured to mate with at least one other display segment. Each display segment includes an inner display panel and an outer display panel, where the outer display panel is spaced apart from and outward of the inner display panel.

In another aspect, an electronic gaming machine lounge is provided. The electronic gaming machine lounge includes a bank of electronic gaming machines, and an overhead display configured to be mounted over the bank of electronic gaming machines. The overhead display includes a plurality of arcuate display segments, where each arcuate display segment of the plurality of arcuate display segments is configured to mate with at least one other arcuate display segment. Each arcuate display segment includes an inner display panel defining an inner arc having an inner radius, and an outer display panel defining an outer arc having an outer radius, where the outer radius is greater than the inner radius, and where the outer display panel is spaced apart in a radially outwardly direction from the inner display panel.

In yet another aspect, a method for displaying content on a ring-shaped overhead display positioned over a bank of electronic gaming machines is provided. The method includes controlling an inner display of the overhead display to display a first set of content, and controlling an outer display of the overhead display to display a second set of content that is different from the first set of content, where the outer display is concentric with and spaced radially outwardly from the inner display.

In yet another aspect, a method for assembling an overhead display assembly is provided. The method includes providing a plurality of display segments, each display segment of the plurality of display segments configured to mate with at least one other display segment. The method also includes coupling each display segment to a support stanchion of a plurality of support stanchions and coupling a first display segment to a second display segment to form the display assembly. The method further includes raising the display assembly on the plurality of support stanchions after coupling the first display segment to the second display segment and coupling the display assembly in communication with an electronic gaming machine.

In yet another aspect, a method for assembling an overhead display assembly is provided. The method includes providing a plurality of display segments, each display segment of the plurality of display segments configured to mate with at least one other display segment. The method also includes coupling a first display segment of the plurality of display segments to a first support stanchion of a plurality of support stanchions and coupling a second display segment of the plurality of display segments to a second support stanchion of the plurality of support stanchions. The method further includes raising the first display segment on the first support stanchion and raising the second display segment on the second support stanchion. The method also includes coupling, after said raising the first and second display segments, the first display segment to the second display segment to form the display assembly.

BRIEF DESCRIPTION OF THE DRAWINGS

An example embodiment of the subject matter disclosed will now be described with reference to the accompanying drawings.

DETAILED DESCRIPTION

An overhead display configured to be mounted over a bank of electronic gaming machines is described. The overhead display may be assembled from a plurality of arcuate display segments, where each arcuate display segment includes an inner display panel and an outer display panel spaced radially outward of the inner display panel and extending substantially coaxially with the inner display panel about a common center axis. Once assembled, the overhead display is ring-shaped and includes an inner display and an outer display formed from the plurality of arcuate display segments.

In operation, a variety of content may be provided to the inner and outer displays of the overhead display. For example, a first set of content may be provided to the inner display, and a second set of content (which may be different from or the same as the first set of content) may be provided to the outer display. In one example, a first set of content, such as a tournament leaderboard, may be display on respective inner display panels of the inner display, while more generalized content, such as a tournament game attract mode animation or graphic, may be display on one or more outer display panels of the out display. In another embodiment, content is transferred using an animation effect, such as a lightning strike, between one or more EGMs positioned under the overhead display and the inner and/or outer displays of the overhead display to create a variety of content delivery and display effects.

Figure 1:
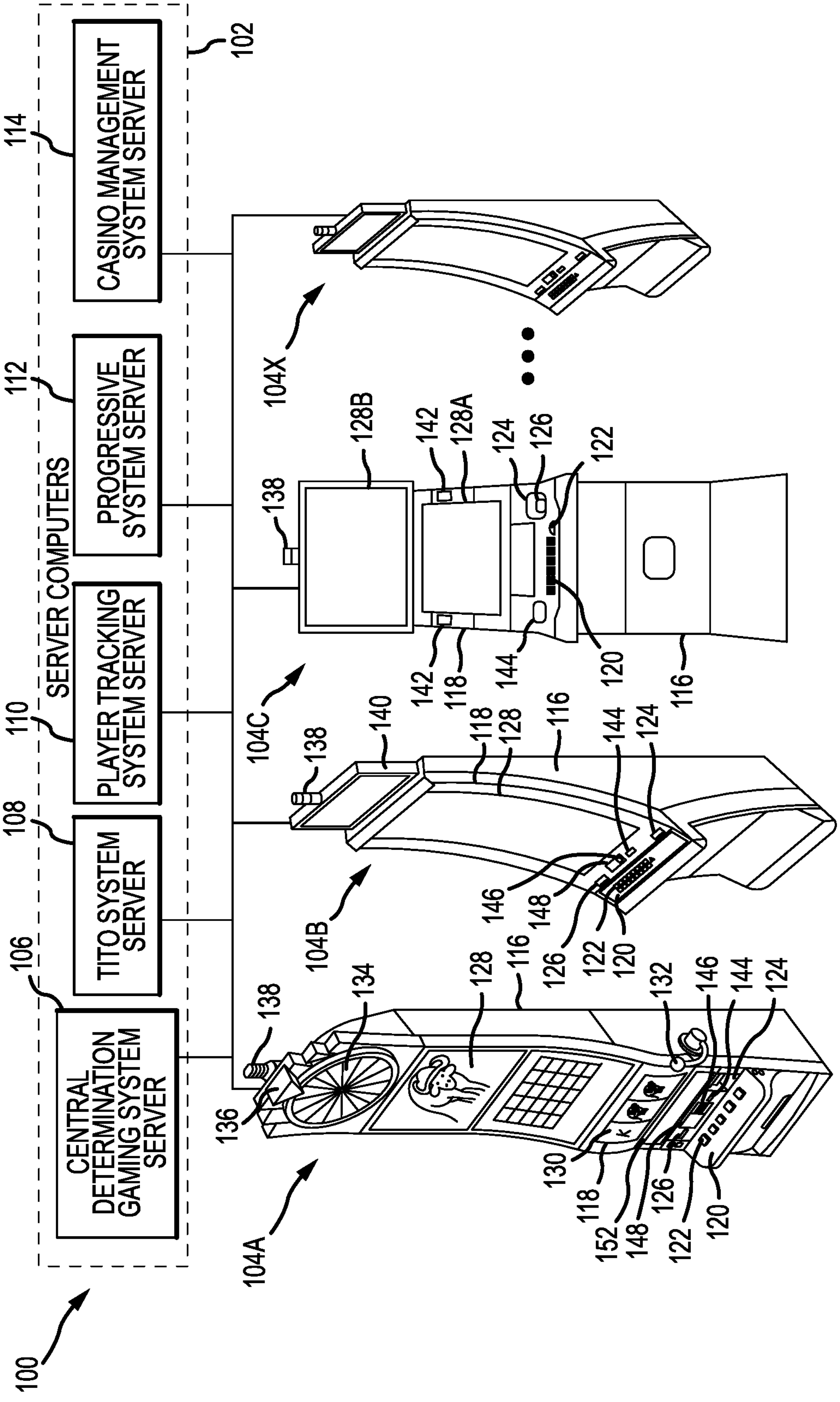
FIG. 1 is an example diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
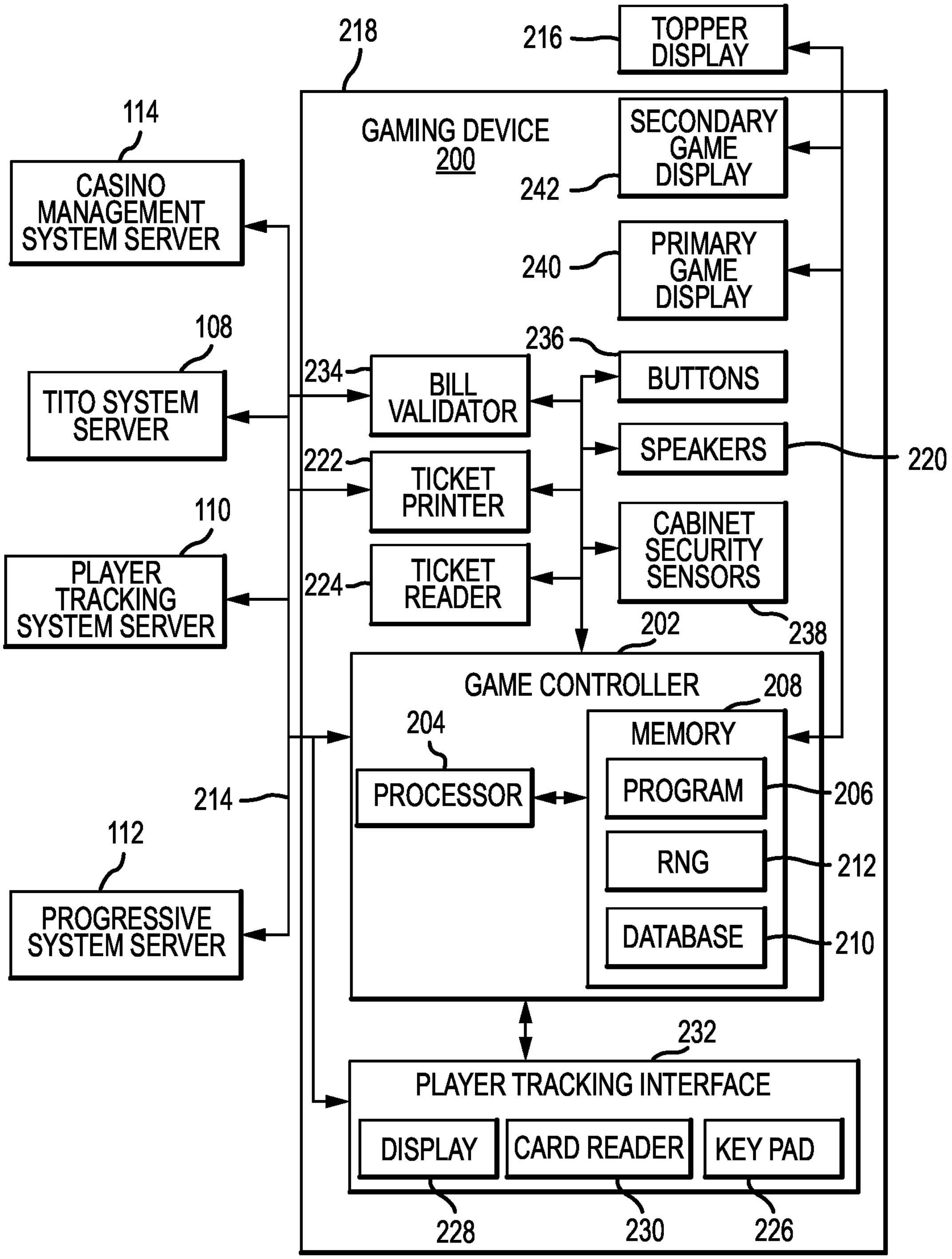
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they facilitate a variety of content delivery effects between one or more EGMs 104A-104X and an inner and/or outer display of an overhead display. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
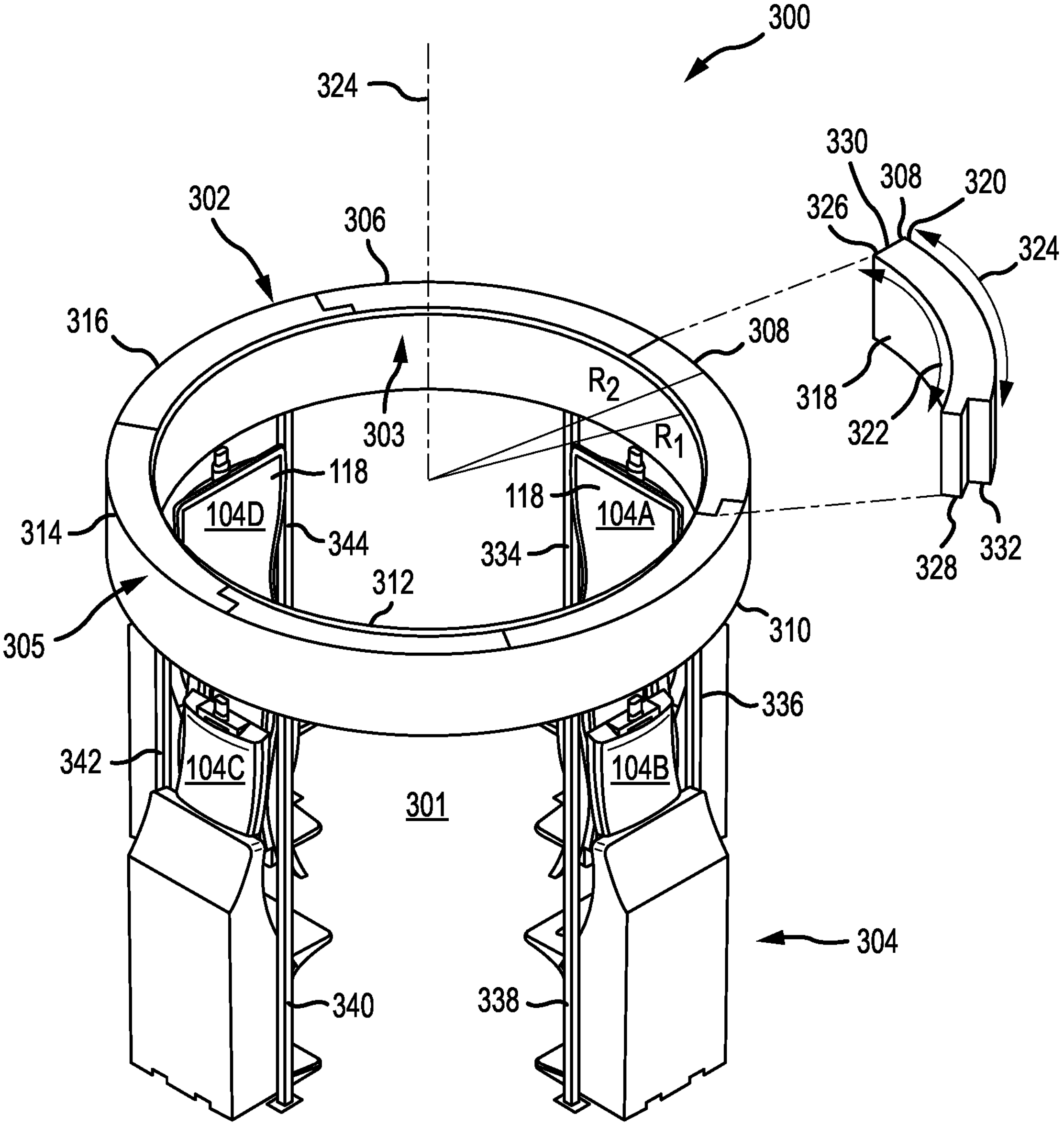
FIG. 3 is a perspective view of an example electronic gaming machine lounge that includes an overhead display mounted over a bank of electronic gaming machines.

FIG. 3 is a perspective view of an example electronic gaming machine lounge 300 (or EGM lounge). In the example embodiment, EGM lounge 300 includes an overhead display 302 mounted over a bank of electronic gaming machines (EGMs) 304. Although overhead display 302 is primarily described herein as being mounted over a bank of EGMs 304, in some embodiments, overhead display 302 may be mounted over a single EGM 104A-104D (or "kiosk") and/or over any other casino gaming device, such as an ATM machine within a casino, a digital display or digital signage within a casino, and the like.

For example, in at least one embodiment, bank of EGMs 304 includes a plurality of EGMs 104A-104X arranged in a ring-shape and oriented such that a gaming display area 118 of each EGM 104A-104X faces inward toward a center or interior portion 301 of the ring-shape, where interior portion 301 of the ring of EGMs 104A-104X may be regarded as a lounge area. Each EGM 104A-104X may also be spaced concentrically apart from an adjacent EGM 104A-104X positioned to either side thereof to define an entrance or opening into interior portion 301. The entrance or opening between EGMs 104A-104X may be sized to accommodate entrance by a player into the lounge area. In the illustrated embodiment, EGM lounge 300 includes four EGMs 104A-104D. However, it will be appreciated that any suitable number of EGMs 104A-104X may be included in EGM lounge 300.

In at least some embodiments, EGMs 104A-104D may be positioned at approximately ninety degree intervals, such that a gaming display area 118 of a first EGM 104A faces a gaming display area 118 of a second EGM 104B disposed diametrically opposite the second EGM 104B. Similarly, a gaming display area 118 of a third EGM 104C may face a gaming display area 118 of a fourth EGM 104D disposed diametrically opposite the third EGM 104C. Thus, a player seated or standing to play a game on any of EGMs 104A-104D may be positioned, as a result of the diametrically opposite positioning of EGMs 104A-104D, in a manner that discourages viewing of any other player's EGM 104A-104D within EGM lounge 300. In other words, EGMs 104A-104D are positioned at ninety degree intervals to facilitate privacy within EGM lounge 300.

As described herein, EGMs 104A-104D within EGM lounge 300 may include an independent game controller 202 (that includes one or more processors 204) and a memory 208 coupled to the processor 204 that stores one or more games or game programs 206. EGMs 104A-104D may also be networked and capable of communicating with one another, such as, for example, through a server system, to facilitate gameplay. For example, in at least one embodiment, EGMs 104A-104D are networked through any of servers 106-112. Likewise, in at least some embodiments, EGMs 104A-104D are networked, as described, to accommodate a tournament game, which may be joined and played using any of EGMs 104A-104D within EGM lounge 300. In simpler terms, EGM lounge 300 may be configured to facilitate a tournament game, where players participate in the tournament game from any of the EGMs 104A-104D within EGM lounge 300.

As described briefly above, EGM lounge 300 also includes an overhead display 302 configured, as described herein, to be mounted over bank of EGMs 304. In the example embodiment, overhead display 302 includes a ring-shaped inner display 303 and a concentric outer display 305 formed from a plurality of arcuate display segments, such as a first arcuate display segment 306, a second arcuate display segment 308, a third arcuate display segment 310, a fourth arcuate display segment 312, a fifth arcuate display segment 314, and a sixth arcuate display segment 316.

In other embodiments, overhead display 302 may define another shape, such as an oval-shape, a polyhedral-shape, and/or any other suitable shape. Likewise, in some embodiments, bank of EGMs 304 may also be arranged in another shape, such as, for example, an oval-shape or a polyhedral-shape, to align under a similarly shaped overhead display 302.

Figure 4:
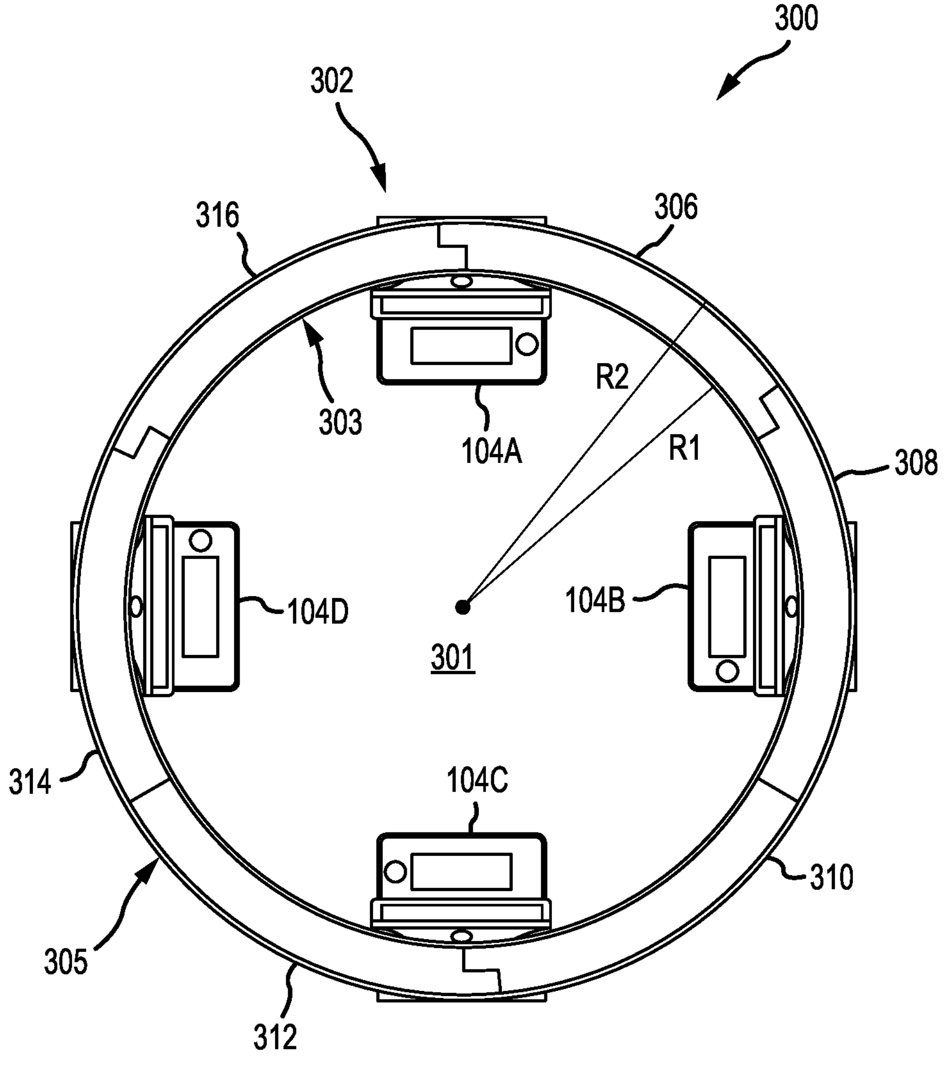
FIG. 4 is a top view of the example electronic gaming machine lounge shown in FIG. 3.

Briefly, FIG. 4 shows a top view of EGM lounge 300 and illustrates the relative position of each arcuate display segment 306-316. Accordingly, and as shown, each arcuate display segment 306-316 spans approximately sixty degrees of a circle (such that, when assembled together as described herein, arcuate display segments 306-316 complete a full three-hundred-and-sixty degree ring or circular shape for overhead display 302). Although six arcuate display segments 306-316 are described, it will be appreciated that overhead display 302 may be divided into any suitable number of arcuate display segments.

Although each arcuate display segment 306-316 is shown to span approximately sixty degrees of a circle, it will be appreciated that an arcuate display segment may span any portion of a circle, depending, for example, upon a total number of arcuate display segments making up overhead sign 302. For instance, if overhead display 302 is formed from two arcuate display segments, each arcuate display segment may span one-hundred-and-eighty degrees. More generally, it is contemplated that an arcuate display segment may span anywhere in the range of ten to one-hundred-and-eighty-degrees.

With returning reference to FIG. 3, each arcuate display segment 306-316 may include an inner display panel and an outer display panel spaced apart from and generally concentric with the inner display panel. For example, as best shown with reference to the enlarged view of second arcuate display segment 308 (shown in FIG. 3), each arcuate display segment 306-316 may, like second arcuate display segment 308, include an inner display panel 318 and an outer display panel 320. Inner display panel 318 may define an inner arc 322 having an inner arc radius, $R_1$. Likewise, outer display panel 320 may define an outer arc 324 having an outer arc radius, $R_2$. Further, as shown, outer display panel 320 is spaced radially apart from and outward of inner display panel 318, and outer arc radius, $R_2$, is greater than inner arc radius, $R_1$. As a result, outer display panel 320 and inner display panel 318 extend substantially coaxially about a common center axis 324 or center point.

In addition, each arcuate display segment 306-316 includes a first end and a second end. For example, as best shown with reference to the enlarged view of second arcuate display segment 308 (shown in FIG. 3), each arcuate display segment 306-316 includes, like second arcuate display segment 308, a first end 326 and a second end 328. First end 326 includes a first engagement surface 330, and second end 328 includes a second engagement surface 332. As described herein, each engagement surface 330 and 332 is configured to mate with (e.g., mechanically and/or electrically engage with) an engagement surface of an adjacent arcuate display segment 306-316. Thus, arcuate display segments 306-316 may be mechanically assembled in a ring-shape to create overhead display 302.

In the example embodiment, electrically coupling adjacent arcuate display segments 306-316 enables transferring at least one of power and data communication between the display segments 306-316. In one embodiment, first engagement surface 330 includes a female connector and second engagement surface 332 includes a female connector that facilitate power and data transfer between display segments 306-316. In particular, in one embodiment, the connectors are fixed on the engagement surfaces 330, 332 such that mechanically coupling adjacent display segments 306-316 also electrically couples the connectors. In another embodiment, the connectors are loose connectors and may include a cord partially received within display segments 306-316 that is coupled independently to a corresponding connector in an adjacent display segment 306-316. One of display segments 306-316 may include a master input that receives power and data communication from an external source and electrical connections between display segments 306-316 may transmit the received power and data communication to each of display segments 306-316. Alternatively, each display segment 306-316 may receive power and data communication independently from an external source.

In the example embodiment, each arcuate display segment 306-316 may also include a display controller (e.g., at least a processor and a memory) configured to control graphics or video displayed on the arcuate display segment 306-316. In other embodiments, only one arcuate display segment 306-316 includes a display controller. In such an embodiment, the display controller may control graphics or video display on each of the arcuate display segments 306-316. To this end, in at least some embodiments, each arcuate display segment 306-316 is also configured to be electrically or communicatively coupled to at least one other arcuate display segment 306-316 (e.g., via one or more electrical connectors) of overhead display.

Likewise, in at least some embodiments, one or more arcuate display segments 306-316 may include a data input port (e.g., a USB port) configured to receive a memory device (e.g., flash memory, such as a thumb-drive). The flash memory may include content for display on one or more display segments 306-316, and a processor or controller of one or more arcuate display segments 306-316 may read the flash memory to retrieve, process, and/or display the content stored thereon. In other embodiments, each of display segments 306-316 is configured for wireless communication with a central controller, via a WiFi, Bluetooth, Near Field Communication, or any other wireless data communication signal. In such embodiments, each of display segments 306-316 may receive data communication independently of the other display segments 306-316 from the central controller.

Likewise, in at least some embodiments, each arcuate display segment 306-316 may be electrically or communicatively coupled to one or more EGMs 104A-104D (e.g., game controllers 202 of each EGM 104A-104D). For example, each arcuate display segment 306-316 may be communicatively coupled to one or more EGMs 104A-104D of bank of EGMs 304. In such an embodiment, each EGM 14A-104D may directly control content displayed on any of arcuate display segments 306-316. For example, an EGM 104A-104D may include a media controller, which may function to provide content to one or more arcuate display segments 306-316. Similarly, as described elsewhere herein, in at least some embodiments, content may provided to overhead display 302 from one or more server systems.

To assemble overhead display 302, each arcuate display segment 306-316 is mechanically coupled to an adjacent arcuate display segment 306-316 at a respective first end and a respective second end (such as first end 326 and second end 328 of second arcuate display segment 308, as described above). Specifically, engagement surfaces (such as engagement surfaces 330 and 332) mate with and mechanically couple to the engagement surfaces of adjacent arcuate display segments 306-316. As described herein, adjacent arcuate display segments 306-316 may also be electrically and/or communicatively coupled.

Thus, first arcuate display segment 306 couples to second arcuate display segment 308 and sixth arcuate display segment 316. Likewise, second arcuate display segment 308 couples to first arcuate display segment 306 and third arcuate display segment 310. Third arcuate display segment 310 couples to second arcuate display segment 308 and fourth arcuate display segment 312. Fourth arcuate display segment 312 couples to third arcuate display segment 310 and fifth arcuate display segment 314. Fifth arcuate display segment 314 couples to fourth arcuate display segment 312 and sixth arcuate display segment 316. Sixth arcuate display segment 316 couples to fifth arcuate display segment 314 and first arcuate display segment 306.

In the final assembly, the inner display panels of each arcuate display segment 306-316 fit together to form inner display 303 of overhead display 302. Likewise, the outer display panels of each arcuate display segment 306-316 fit together to form outer display 305 of overhead display 302.

Overhead display 302 is also supported on a plurality of posts or support stanchions, such as, for example, a first support stanchion 334, a second support stanchion 336, a third support stanchion 338, a fourth support stanchion 340, a fifth support stanchion 342, and a sixth support stanchion 344. Although six support stanchions 334-344 are described, it will be appreciated that any suitable number of support stanchions may be implemented. Further, although six support stanchions 334-344 are described herein, it will be appreciated that any suitable number of support stanchions may be used. In some embodiments, overhead display 302 may be supported by bank of EGMs 304 and/or by one or more EGMs 104A-104D directly. In other embodiments, overhead display 302 may be suspended from a ceiling surface, such as by one or more wires or suspension cables.

In the example embodiment, each support stanchion 334-344 mechanically couples to and supports a respective arcuate display segment 306-316. Hence, there are six support stanchions 334-344, one for each arcuate display segment 306-316. However, in other embodiments, pairs or groups of arcuate display segments 306-316 may be raised and supported by a single support stanchion 334-344.

Further, each support stanchion 334-344 may attached to a respective arcuate display segment 306-316 at a location that facilitates raising and lowering the arcuate display segment 306-316 independently of other arcuate display segments 306-316. For example, each support stanchion 334-344 may mechanically couple to an arcuate display segment 306-316 substantially at a midpoint under the arcuate display segment 306-316.

To raise and lower each arcuate display segment 306-316 on a respective support stanchion 334-344, an actuator may be engaged with each support stanchion 334-344. For example, in at least some embodiments, each support stanchion 334-344 may include a telescoping body capable of engagement by an actuator. The actuator may engage and drive the telescoping body through a range of linear motion to raise and lower a respective arcuate display segment 306-316 on the support stanchion 334-344.

In other embodiments, overhead display 302 may be assembled in a ring shape, as described herein, substantially at floor level, lifted by one or more casino operators onto a lowered (i.e., non-telescoped) plurality of support stanchions 334-344, mechanically coupled to the support stanchions 334-344, and raised above floor level thereafter. Thus, arcuate display segments 306-316 may be raised and lowered in more than one way.

In particular, the telescoping bodies of support stanchions 334-344 may be linearly extendable between a raised configuration (e.g., as shown in FIG. 3) and a lowered configuration (not shown). In the lowered configuration, the height of support stanchions 334-344 may be lowered relative to the raised configuration so that display segments 306-316 may be lifted onto to support stanchions 334-344 (e.g., by one or more installation technicians). In particular, support stanchions 334-344 may extend a height in the lowered configuration that is between 5% and 80% of the height of support stanchions 334-344 in the raised configuration. In one embodiment, support stanchions 334-344 extend a height in the lowered configuration that is approximately 50% of the height of support stanchions 334-344 in the raised configuration. More specifically, in the example embodiment, support stanchions 334-344 in the lowered configuration have a height of approximately six feet and are extendable to have a height of approximately twelve feet in the raised configuration. In other embodiments, support stanchions 334-344 have a height of one foot in the lowered configuration. In further embodiments, support stanchions 334-344 have any height in the raised and lowered configurations that enables support stanchions 334-344 to function as described herein.

In one embodiment, the actuator that drives support stanchions 334-344 between the lowered and raised configurations is one of a mechanical actuator and electromechanical actuator. For example, the actuator in such embodiments may include at least one of a motor and a manually operated drive, such as a hand crank or winch. The actuator may be coupled to support stanchions 334-344 and optionally, received within the support stanchions. For example, in an embodiment where the actuator includes a motor received within support stanchions 334-344, support stanchions 334-344 may include a power coupling for coupling an external power source in electrical communication with the motor. In such embodiments, the power coupling in support stanchions 334-344 is also configured to be in electrical communication with display segments 306-316 when display segments 306-316 are coupled to support stanchions 334-344. Additionally, or alternatively, in some embodiments the motor may be battery powered. The telescoping body may include telescoping sections that are engaged with one another via a cam mechanism configured to convert rotational movement by the actuator into linear movement of the telescoping sections. In one embodiment the cam mechanism includes cam slots that are sized to mate with corresponding cam pins. In another embodiment, at least one of the telescoping sections is threadably engaged with a shaft coupled to the actuator. During operation, actuation of the motor or manual drive may rotate the shaft, which is translated by the cam mechanism into linear movement of a telescoping section of the stanchion body.

In another embodiment, the actuator is a hydraulic actuator that includes a cylinder configured to be pressurized by a fluid. In some such embodiments, pressurizing the cylinder may drive the telescoping body of support stanchions 334-344 from the lowered configuration to the raised configuration. In particular, in some embodiments, at least one of the sections of the telescoping body is received within the cylinder. In such embodiments, the section of the telescoping body received within the cylinder is sized to extend out of the cylinder, when the cylinder is pressurized, to linearly extend the support stanchion 334-344 to the raised configuration. In another embodiment, a piston is received within the cylinder of the hydraulic actuator. In such embodiments, pressurization of the cylinder causes the piston to extend from the cylinder to engage and drive a section of the telescoping body linearly relative to an adjacent section to transition support stanchions 334-344 from the lowered configuration to the raised configuration.

In another embodiment, the actuator may be spaced from support stanchions 334-344. For example, in some embodiments, one of display segments 306-316 and support stanchions 334-344 includes a coupling element configured to attach to a cable for lifting display segments 306-316 and raising support stanchions 334-344. Under tension, the cable may provide a lifting force to support stanchions 334-344 to extend the telescoping body to the raised configuration. For example, in one embodiment, a pully is provided that is coupled to a support structure (e.g., such as an external frame or ceiling) positioned vertically above the position of display segments 306-316, when support stanchions 334-344 are in the raised configuration. In such embodiments, the cable is coupled to support stanchions 334-344 and/or display segments 306-316 and extends through the pulley to a drive positioned at floor level. The drive may be actuated to wind the cable on a winch and lift support stanchions 334-344 and/or display segments 306-316 to the raised configuration. In other embodiments, the drive may be provided vertically above support stanchions 334-344.

Additionally, in some embodiments, support stanchions 334-344 may include a locking mechanism (not shown) for locking the stanchions 334-344 in at least one of the raised and lowered configurations. The locking mechanism may include a pin-hole alignment in portions of the telescoping body such that, when the stanchions 334-344 are raised, holes in adjacent sections of the telescoping body are positioned in alignment and a pin may be received through the holes to prevent movement of the adjacent sections relative to one another.

In another embodiment, support stanchions 334-344 may be posts having non-extendable bodies and display segments 306-316 may be lifted onto support stanchions 334-344 via a separate lifting mechanism. For example, in one embodiment, the lifting mechanism may include separate installation stanchions (not shown) that are operable to move display segments 306-316 to a raised position (e.g., as shown in FIG. 3). The installation stanchions may have telescoping bodies and be configured to raise display segments 306-316 by an actuator in substantially the same manner as described above with respect to support stanchions 334-344. Once display segments 306-316 have been raised, support stanchions 334-344 may be coupled to display segments 306-316, to engage and supporting display segments 306-316 in the raised position, and the installation stanchions may be withdrawn.

In another embodiment in which support stanchions 334-344 have non-extendable bodies, the lifting mechanism may be integrated into support stanchions 334-344 and operable to raise display segments 306-316 along support stanchions 334-344. In at least some such embodiments, display segments 306-316 may include vertically extending apertures extending therethrough for receiving support stanchions 334-344 therein. In such embodiments, the apertures in display segments 306-316 enable display segments 306-316 to be raised vertically on support stanchions 334-344 into the raised position. In another embodiment, display segments 306-316 may be raised on support stanchions 334-344 adjacent to the external surfaces of support stanchions 334-344. In some such embodiments, once raised on the support stanchions 334-344, the display segments may be moved laterally (e.g., manually or by a guide structure on support stanchions 334-344) such that display segments 306-316 are positioned directly over the upper ends of support stanchions 334-344.

In one embodiment, the lifting mechanism includes a cable and lift support integrated into support stanchions 334-344. In such embodiments, support stanchions 334-344 may include pulleys at opposed ends of the support stanchion 334-344 and a cable that extends around the pulleys and engages the lift support. Display segments 306-316 may be coupled to the lift support and translation of the cable around the pulleys (e.g., via manual or electromechanical actuation) may move the lift support and display segments 306-316 between a lowered position on support stanchions 334-344 to a raised position in which display segments 306-316 may be coupled to the top ends of support stanchions 334-344. In another embodiment each support stanchion 334-344 may be provided with a motorized carriage (not shown) that is operable to move display segments 306-316 vertically along support stanchions 334-344. In some such embodiments, the motorized carriages may be configured to removably couple to an external surface of support stanchions 334-344 to enable them to be reused in assemblies of multiple lounges.

Figure 5:
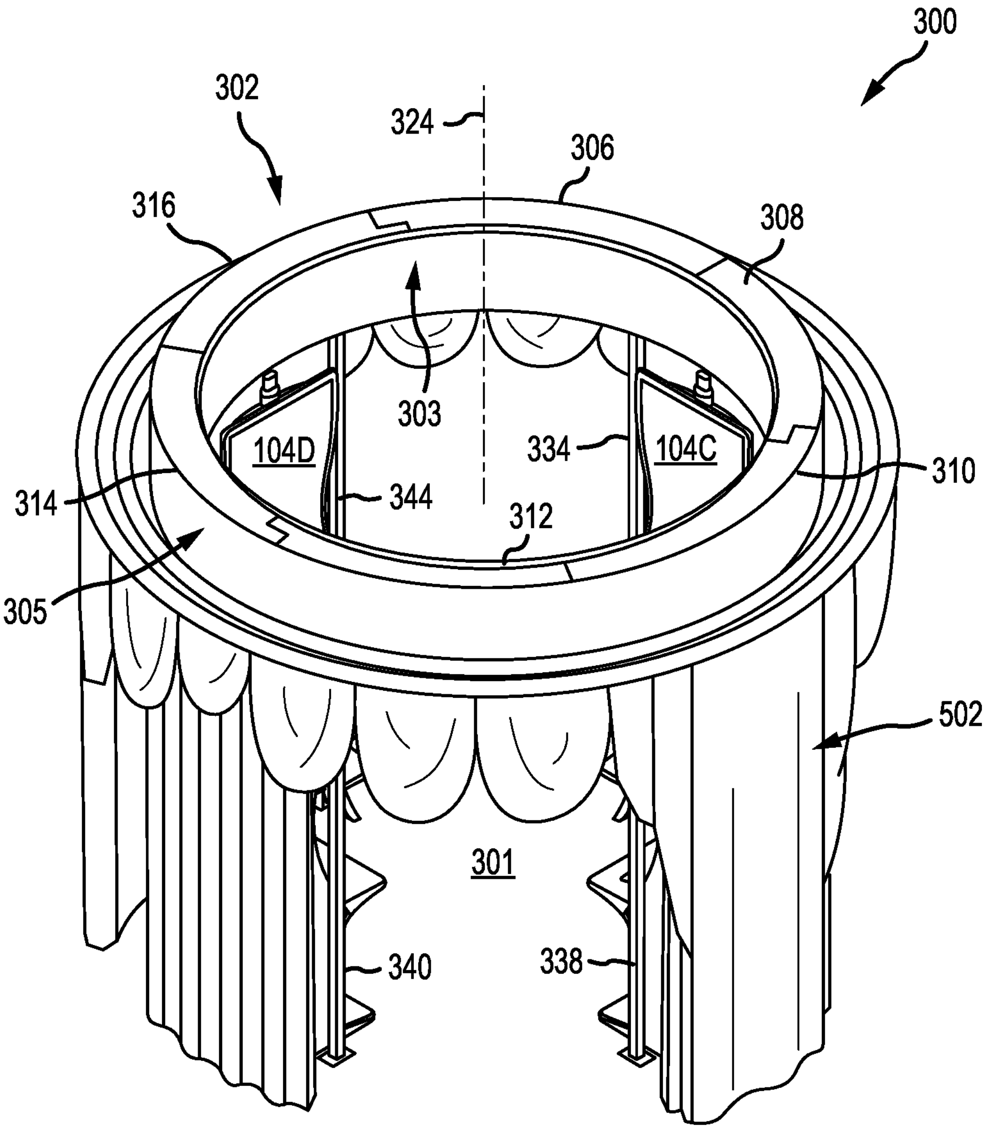
FIG. 5 is a perspective view of the electronic gaming machine lounge shown in FIG. 3 and FIG. 4, in which the electronic gaming machine lounge includes a privacy curtain.

FIG. 5 is a perspective view of EGM lounge 300, in which EGM lounge 300 includes a privacy curtain 502. Specifically, as shown, privacy curtain 502 may attached to a portion of overhead display 302 and descend from overhead display 302 substantially to floor level. As a result, privacy curtain 502 may be added to EGM lounge 300 to provide privacy to players within EGM lounge 300. Privacy curtain 502 may, in addition, obscure the inner display panels of arcuate display segments 306-316 from the exterior of EGM lounge 300. Thus, a casino patron located outside EGM lounge 300 may be able to view content displayed out the outer display panels of arcuate display segments 306-316 but may not be able to see content displayed on the inner display panels.

In various embodiments, an overhead display may be any suitable shape, such as, for example, any suitable shape other than the ring or circular shape described above. For example, as described herein, an overhead display may include any other curved or polyhedral shape. Examples include, but are not limited to, an oval-shape, a triangle-shape, a rectangle-shape, a square-shape, a hexagon shape, an octagon shape, and the like. Several such shapes are illustrated with reference to FIGS. 6-9, as described below.

Figure 6:
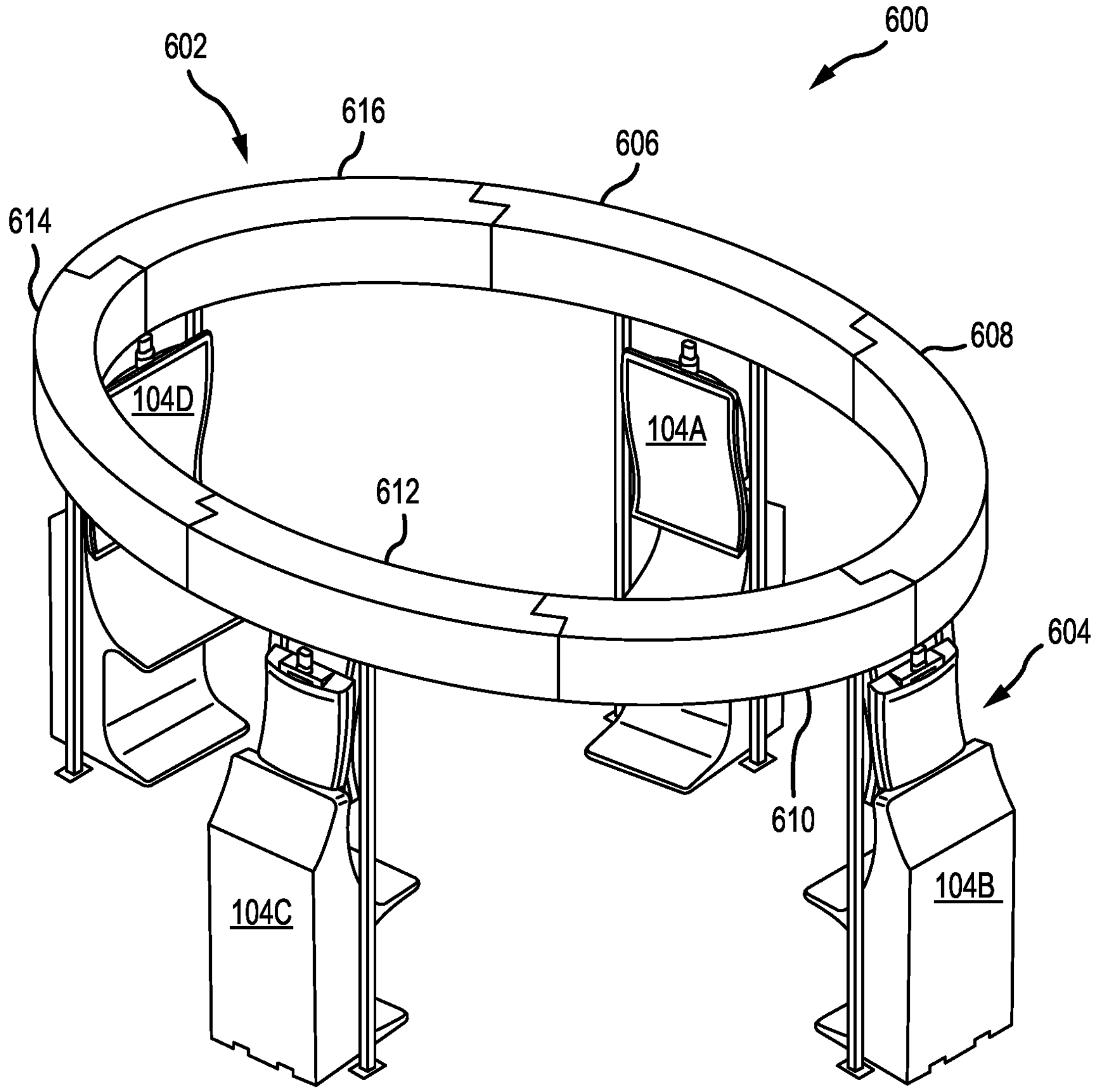
FIG. 6 is a perspective view of another example electronic gaming machine lounge that includes an oval-shaped overhead display mounted over a bank of electronic gaming machines.

Accordingly, FIG. 6 is a perspective view of an example electronic gaming machine lounge 600 that includes an oval-shaped overhead display 602 mounted over a bank of electronic gaming machines 604. In this example, overhead display 602 is formed from a plurality of arcuate display segments 606, 608, 610, 612, 614, 616, and 618. As described herein, each arcuate display segment may include an inner display panel and an outer display panel and may mate with or couple to another arcuate display segment 606-618 at an edge or engagement surface thereof, whereby oval-shaped overhead display 602 may be formed. Further, each EGM 104A-104D of bank of electronic gaming machines 604 may be positioned in a shape or arrangement on a casino floor underneath oval-shaped overhead display 602 to give electronic gaming machine lounge 600 an overall oval-shape.

Figure 7:
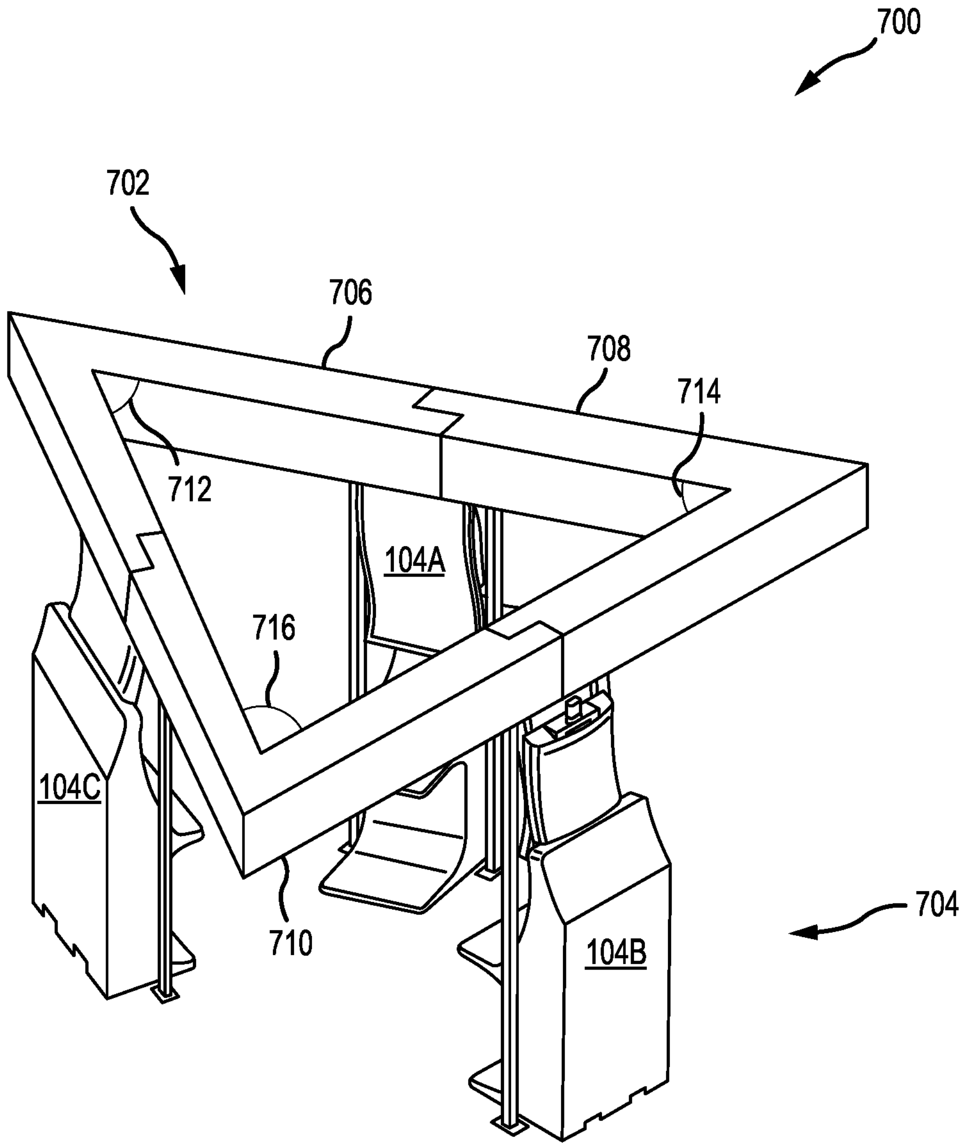
FIG. 7 is a perspective view of another example electronic gaming machine lounge that includes a triangle-shaped overhead display mounted over a bank of electronic gaming machines.

Likewise, FIG. 7 is a perspective view of another example electronic gaming machine lounge 700 that includes a triangle-shaped overhead display 702 mounted over a bank of electronic gaming machines 704. In this example, overhead display 702 is formed from a plurality of angled display segments 706, 708, and 710. Specifically, as shown, each angled display segment 706, 708, and 710 may include a respective corner or angle 712, 714, and 716, respectively. However, in other embodiments, overhead display 702 may be formed from a plurality of straight segments, which may be mechanically coupled, as described herein, to give overhead display 702 a triangle-shape.

In addition, as described herein, each angled (or straight) display segment 706-710 may include an inner display panel and an outer display panel and may mate with or couple to another angled (or straight) display segment 706-710 at an edge or engagement surface thereof, whereby triangle-shaped overhead display 702 may be formed. Further, each EGM 104A-104C of bank of electronic gaming machines 704 may be positioned in a shape or arrangement on a casino floor underneath triangle-shaped overhead display 702 to give electronic gaming machine lounge 700 an overall oval-shape.

Figure 8:
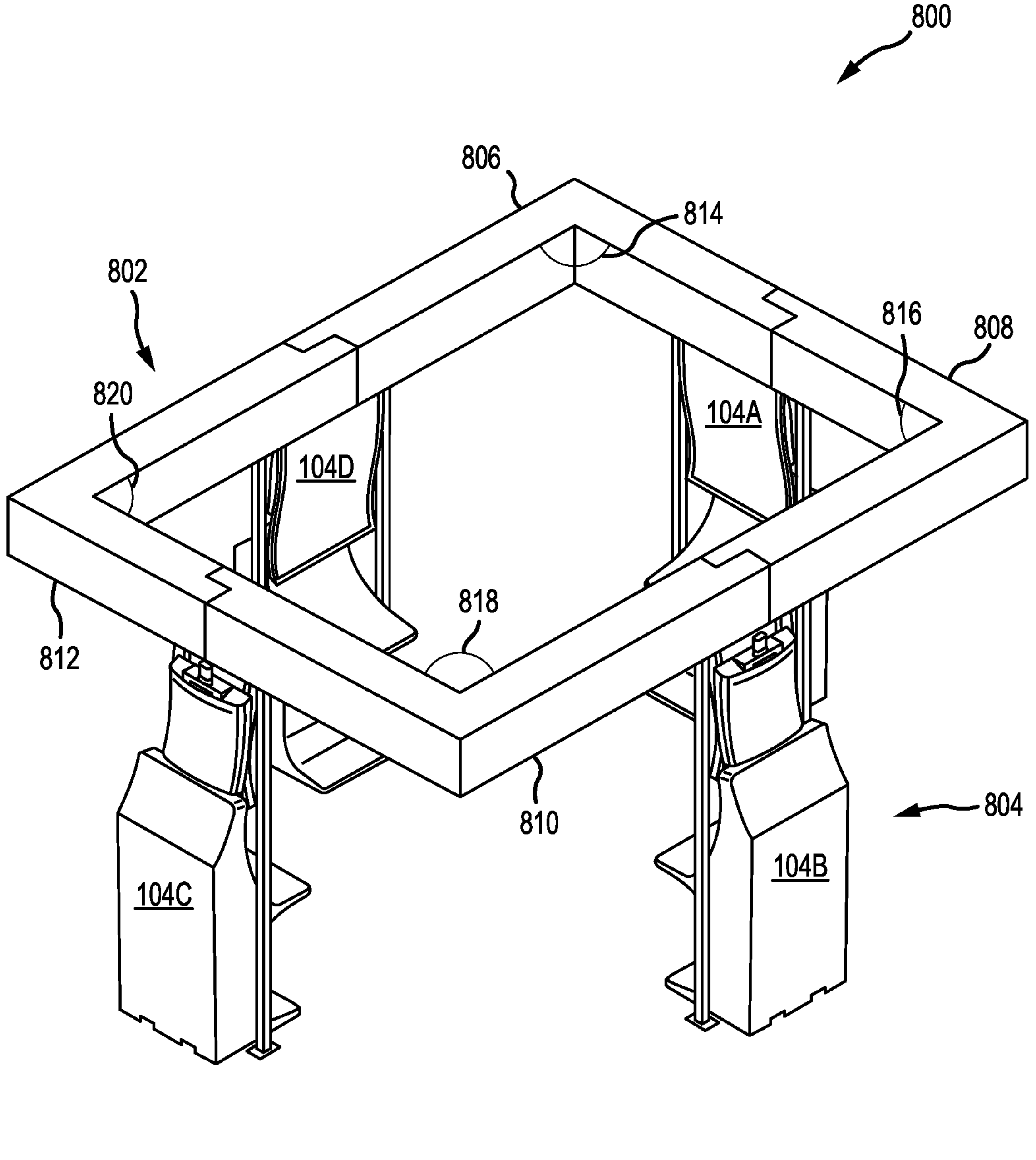
FIG. 8 is a perspective view of another example electronic gaming machine lounge that includes a rectangle-shaped overhead display mounted over a bank of electronic gaming machines.

FIG. 8 is a perspective view of another example electronic gaming machine lounge 800 that includes a rectangle-shaped overhead display 802 mounted over a bank of electronic gaming machines 804. In this example, overhead display 802 is formed from a plurality of angled display segments 806, 808, 810, and 812. Specifically, as shown, each angled display segment 806, 808, 810, and 812 may include a respective corner or angle 814, 816, 818, and 820, respectively. However, in other embodiments, overhead display 802 may be formed from a plurality of straight segments, which may be mechanically coupled, as described herein, to give overhead display 802 a rectangle-shape.

In addition, as described herein, each angled (or straight) display segment 806-812 may include an inner display panel and an outer display panel and may mate with or couple to another angled (or straight) display segment 806-812 at an edge or engagement surface thereof, whereby rectangle-shaped overhead display 802 may be formed. Further, each EGM 104A-104D of bank of electronic gaming machines 804 may be positioned in a shape or arrangement on a casino floor underneath rectangle-shaped overhead display 802 to give electronic gaming machine lounge 800 an overall rectangle-shape.

Figure 9:
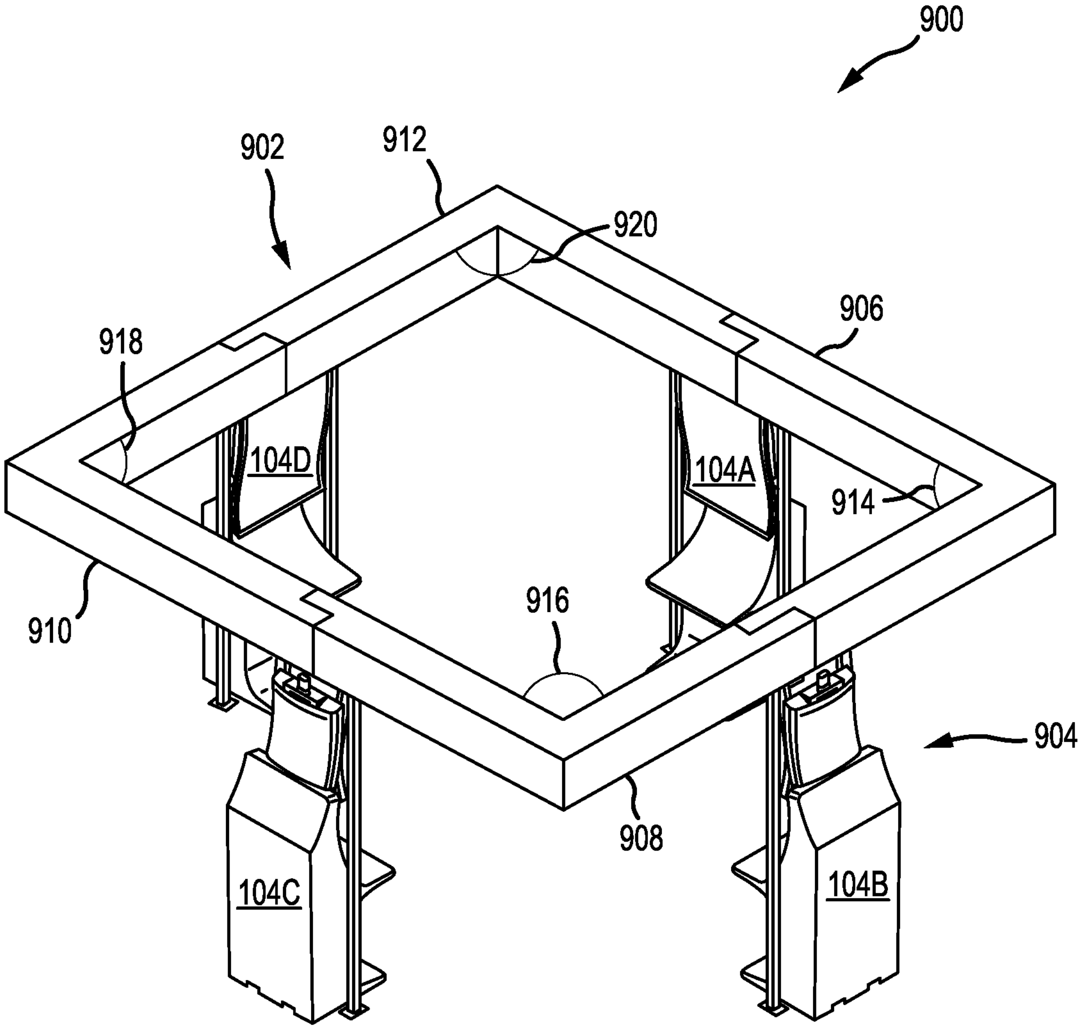
FIG. 9 is a perspective view of another example electronic gaming machine lounge that includes a square-shaped overhead display mounted over a bank of electronic gaming machines.

FIG. 9 is a perspective view of another example electronic gaming machine lounge 900 that includes a square-shaped overhead display 902 mounted over a bank of electronic gaming machines 904. In this example, overhead display 902 is formed from a plurality of angled display segments 906, 908, 910, and 912. Specifically, as shown, each angled display segment 906, 908, 910, and 912 may include a respective corner or angle 914, 916, 918, and 920, respectively. However, in other embodiments, overhead display 902 may be formed from a plurality of straight segments, which may be mechanically coupled, as described herein, to give overhead display 902 a square-shape.

In addition, as described herein, each angled (or straight) display segment 906-912 may include an inner display panel and an outer display panel and may mate with or couple to another angled (or straight) display segment 906-912 at an edge or engagement surface thereof, whereby square-shaped overhead display 902 may be formed. Further, each EGM 104A-104D of bank of electronic gaming machines 904 may be positioned in a shape or arrangement on a casino floor underneath square-shaped overhead display 902 to give electronic gaming machine lounge 900 an overall square-shape.

Figure 10:
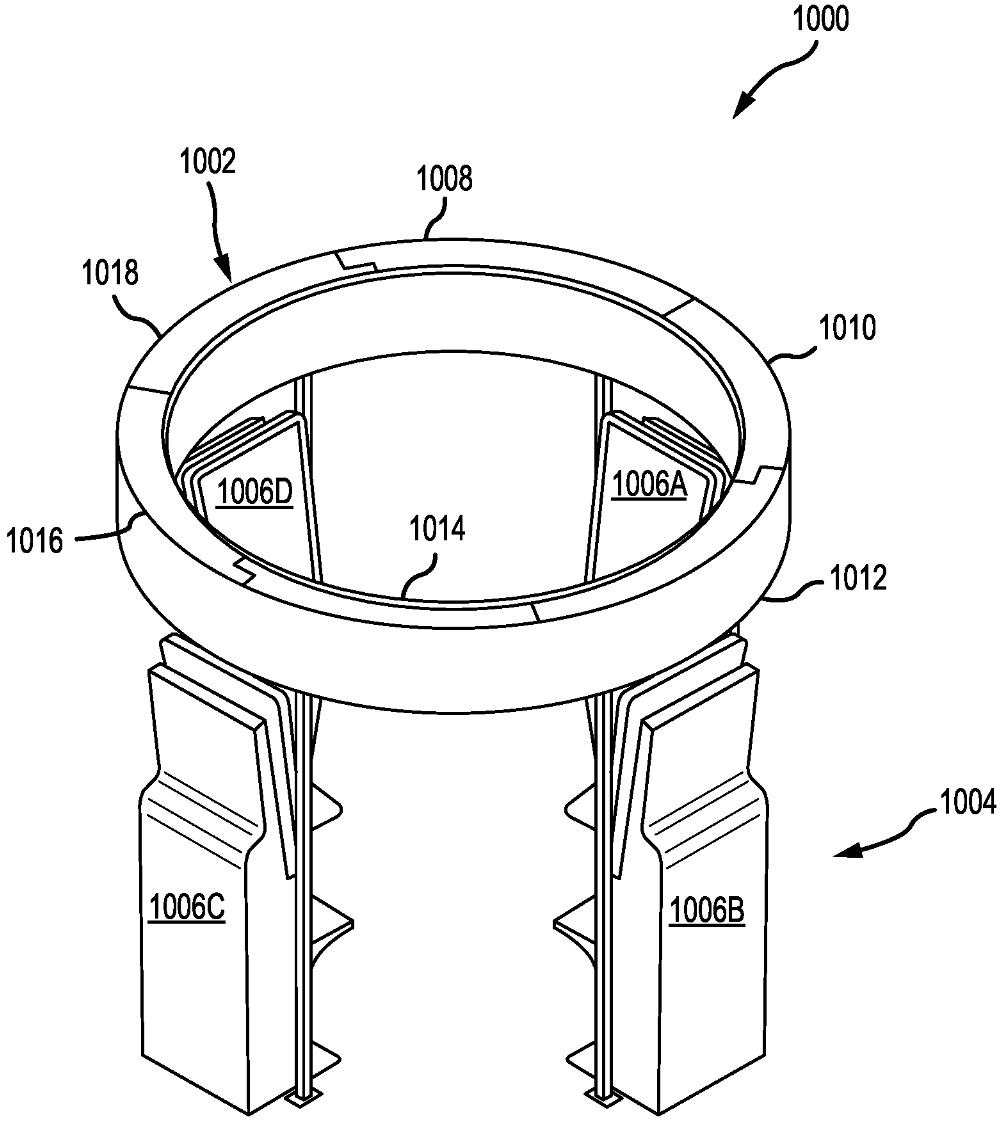
FIG. 10 is a perspective view of an example kiosk gaming lounge that includes an overhead display mounted over a bank of gaming kiosks.

FIG. 10 is a perspective view of an example kiosk gaming lounge 1000 that includes an overhead display 1002 mounted over a bank of gaming kiosks 1004. Kiosk gaming lounge 1000 may be substantially identical to any of the EGM lounges 300-900 described herein, with the exception that bank of EGMs 104A-104X may be replaced by a plurality of gaming kiosks 1006A-1006D, where a kiosk 1006A-1006D may, as described herein, function to permit a player to check or recharge a credit balance associated with a player tracking account and/or perform a variety of other player and game related tasks. Similar to overhead display 302, overhead display 1002 is formed from a plurality of arcuate display segments 1008, 1010, 1012, 1014, 1016, and 1018 each having an inner display panel and an outer display panel, as described herein. Further, although kiosks 1006A-1006D are positioned, in this example, in a circular shape, it will be appreciated that kiosks 1006A-1006D may be positioned in any suitable shape, including those described herein. Likewise, overhead display 1002 may be formed or assembled in any suitable shape as well (e.g., any polyhedral or ring shape).

Figure 11:
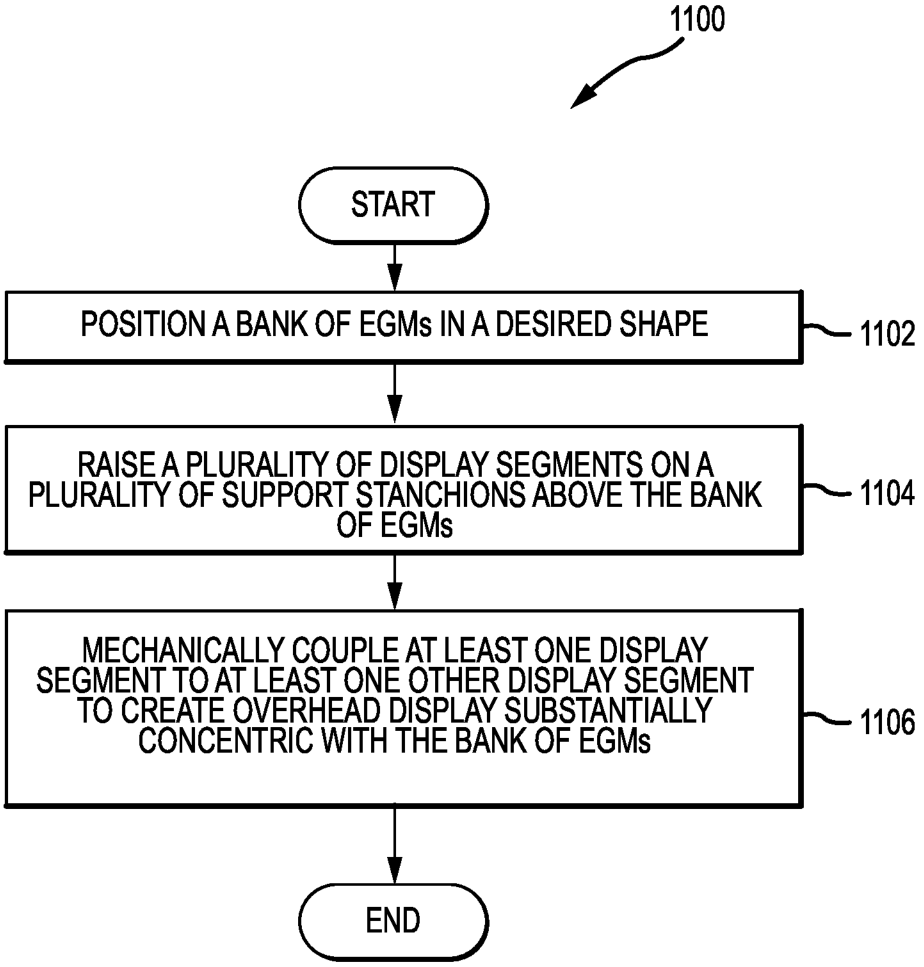
FIG. 11 is a flowchart illustrating an example process for assembling the electronic gaming machine lounge shown in FIGS. 3-9 and the kiosk gaming lounge shown in FIG. 10.

FIG. 11 is a flowchart illustrating an example process 1100 for assembling an EGM lounge, such as any of EGM lounges 300, 600, 700, 800, or 900 and/or kiosk gaming lounge 1000. Accordingly, in at least one embodiment, and as described above, bank of EGMs 304, 604, 704, 804, or 904 (and/or bank of kiosks 1004) may be arranged or positioned in a desired shape (e.g., a ring-shape, an oval-shape, a triangle-shape, a rectangle-shape, or a square-shape) on a floor surface (step 1102). For example, EGMs 104A-104D of bank of EGMs 304 may be arranged at ninety degree intervals, such that a gaming display area 118 of first EGM 104A faces a gaming display area 118 of second EGM 104B disposed diametrically opposite second EGM 104B. Similarly, a gaming display area 118 of third EGM 104C may face a gaming display area 118 of fourth EGM 104D disposed diametrically opposite third EGM 104C. Although four EGMs 104A-104D are described, it will be appreciated that any suitable number of EGMs 104A-104X may be included in bank of EGMs 304, 604, 704, 804, or 904. Likewise, any number of kiosks 1006A-1006D may be included in bank of kiosks 1004.

In addition, overhead display 302, 602, 702, 802, 902, 1002 may be assembled, as described herein, from one or more display segments, such as, for example, arcuate display segments 306-316. For example, each arcuate display segment 306-316 may be mechanically and/or electrically coupled to two other arcuate display segments 306-316 (one on each end) to form overhead display 302, which after assembly, is also ring-shaped. Specifically, overhead display 302 may be assembled from arcuate display segments 306-316, such that a diameter of overhead display 302 is substantially equal to a diameter of the ring-shape formed by bank of EGMs 304. Likewise, display segments of the lounges 600, 700, 800, 900, 1000 may be similarly assembled to form an overhead display 602, 702, 802, 902, 1002 having a desired shape (e.g., an oval-shape, a triangle-shape, a rectangle-shape, a square-shape, etc.)

In one embodiment, each display segment (e.g., each arcuate display segment 306-316) may be independently coupled to and raised on a respective support stanchion (e.g., support stanchions 334-344) prior to coupling arcuate display segments 306-316 in a ring-shape (step 1104). The same may likewise apply to raising display segments of lounges 600, 700, 800, 900, and 1000. Once each arcuate display segment 306-316 is in a raised position, arcuate display segments 306-316 may be coupled, as described herein, to create overhead display 302, which is ring-shaped in its final assembly (step 1106). In another embodiment, overhead display 302 may be first assembled from arcuate display segments 306-316, positioned on support stanchions 334-344 after assembly, and raised, such as by a plurality of actuators, into an overhead position above bank of EGMs 304. The actuators may include one of a mechanical, electromechanical, and hydraulic actuator. In one embodiment, the actuator may include a drive that is spaced from the support stanchion and engaged with one of display segments 306-316 (e.g., by a cable) to raise display segments 306-316 on support stanchions 334-344.

In one embodiment, each of support stanchions 334-344 may include a body that is extendable between a lowered configuration and a raised configuration. Display segments 306-316 may be raised on support stanchions 334-344 by extending the bodies from the lowered configurations to the raised configurations. In another embodiment, the support stanchions 334-344 are posts having non-extendable bodies. In some such embodiments, a lift mechanism may be provided that is operable to raise the display segments 306-316 on support stanchions 334-344.

Figure 12:
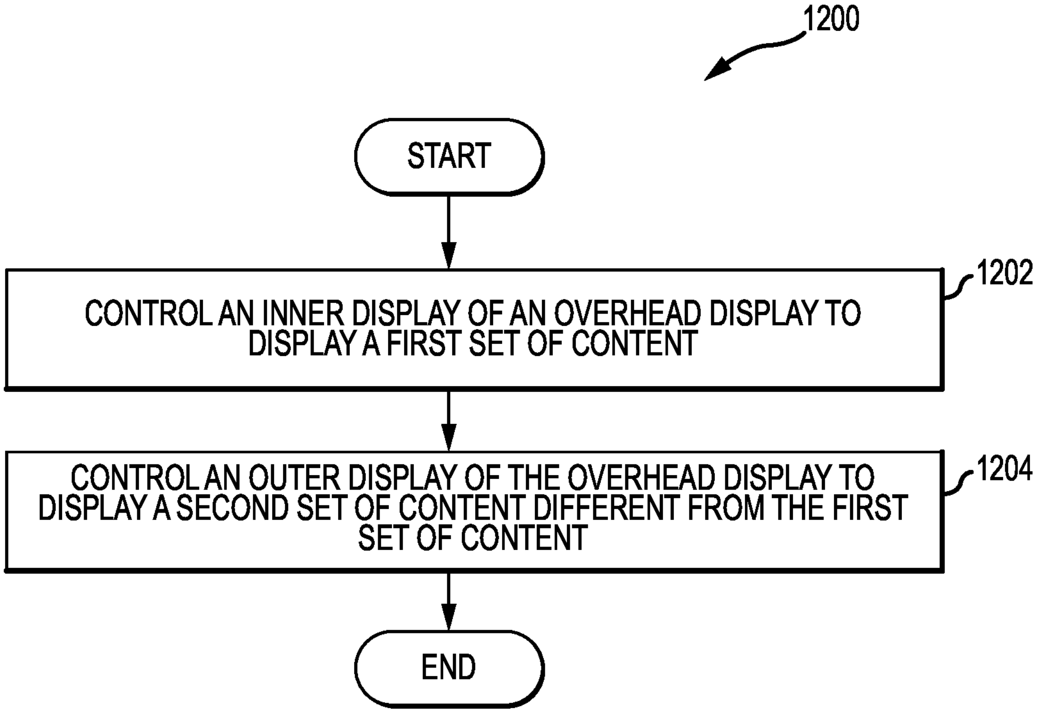
FIG. 12 is a flowchart illustrating an example process for displaying content on the overhead display of the electronic gaming machine lounge shown in FIGS. 3-9 and the kiosk gaming lounge shown in FIG. 10.

FIG. 12 is a flowchart illustrating an example process 1200 for displaying content on an overhead display (such as overhead display 302, 602, 702, 802, 902, or 1002) of a lounge (such as any of lounges 300, 600, 700, 800, 900, or 1000). Accordingly, in one example embodiment, a controller, such as a game controller 202 of an EGM 104A-104D within bank of EGMs 304 and/or a display controller of any arcuate display segment 306-316, controls overhead display 302 to display a first set of content on inner display 303 (step 1202).

As described herein, any EGM 104A-104D of bank of EGMs 304 may communicate with and control any arcuate display segment(s) 306-316. In addition, any EGM 104A-104D may control what is displayed on the entire overhead display 302, such as by controlling each arcuate display segment 306-316 independently and/or by providing a control instruction to a display controller of one arcuate display segment 306-316, which may communicate the control instruction to other arcuate display segments 306-316. Likewise, in at least some embodiments, one or more display controllers of overhead display 302 may communicate with a server system 106-114 to receive and display content.

Thus, a first set of content may be displayed on each inner display panel forming inner display 303 of overhead display 302. The first set of content may, in at least some embodiments, relate to a game being played on at least one EGM 104A-104D of bank of EGMs 304. For example, EGM 104A may implement a first game, EGM 104B may implement a second game, EGM 104C may implement a third game, and EGM 104D may implement a fourth game. In this case, the first set of content display on inner display may relate to any of the first, second, third, or fourth games. For example, the first set of content may indicate a game outcome (or outcomes, such as an award or jackpot) provided in any of the four games. As described elsewhere herein, the first set of content may also include a tournament leaderboard from a tournament game played on EGMs 104A-104D.

Likewise, in at least some embodiments, each inner display panel of each arcuate display segment 306-316 may display a set of content related to a game implemented on any of EGMs 104A-104D. For instance, an inner display panel of second arcuate display segment 308 may display content related to a game played on EGM 104A, while an inner display panel of third arcuate display segment 310 may display content related to a game played on EGM 104B. More generally, each inner display panel of each arcuate display segment 306-316 may display content related to a game played on an EGM 104A-104D positioned under (or substantially under) the respective arcuate display segment 306-316.

If the game is a tournament game, each inner display panel of each arcuate display segment 306-316 may display at least one relative position of a player on a tournament leaderboard. For example, each inner display panel of each arcuate display segment 306-316 may display a relative tournament position of a player (e.g., on a leaderboard) on an EGM 104A-104D positioned under (or substantially under) the respective arcuate display segment 306-316

In addition, content may be controlled, as described herein, in a manner that causes the content to appear to move between an EGM 104A-104D and an inner display panel of an arcuate display segment 306-316. For example, when an award (e.g., a jackpot) is provided in an EGM 104A-104D, the content may also be controlled to move or "fly up" to one or more inner display panels of one or more arcuate display segments 306-316. As a result, other players within EGM lounge 300 (who are facing away from the player achieving the award, as described above) may see an indication on inner display 303 that another player has achieved an award (thereby adding to player excitement).

Content may also appear to "fly down" (e.g., in the form of a lightning strike) from one or more inner display panels of one or more arcuate display segments 306-316 to one or more EGMs 104A-104D. For example, in at least one embodiment, when a player achieves a certain type of game event (e.g., an award, such as a jackpot), content related to the game event may initially fly up from the player's EGM 104A-104D to an inner display panel of an arcuate display segment 306-316. Thereafter, the content may be displayed on one or more other inner display panels of one or more other arcuate display segments 306-316 (e.g., all inner display panels), whereupon content may fly or down (e.g., as a lightning strike) to the gaming display areas 118 of one or more other EGMs 104A-104D. Content may also transition from an inner display panel of an arcuate display segment 306-316 to an outer display panel of the same arcuate display segment 306-316 and/or another arcuate display segment 306-316.

Thus, content may move or flow between EGMs 104A-104D and inner display panels of arcuate display segments 306-316 in a variety of patterns and using a variety of animations, where a lighting strike effect is only one of many possible such animated effects. Content may also be distributed, with inner display 303 of overhead sign 302 functioning as a content distributor, from one EGM 104A-104D to one or more other EGMs 104A-104D. For example, when one player wins an award, content related to the award may fly up to inner display 303 and back down, in the form of an award to one or more other players within EGM lounge 300, to one or more other EGMs 104A-104D.

In the example embodiment, a controller, such as a game controller 202 of an EGM 104A-104D within bank of EGMs 304 and/or a display controller of any arcuate display segment 306-316, also controls overhead display 302 to display a second set of content on outer display 305 (step 1104). In some embodiments, the second set of content may be similar to, or the same as, the first set of content. For example, the second set of content may mirror the first set of content, such that the first set of content is display on an inner display panel of one or more arcuate display segments 306-316 as well as a corresponding outer display panel of the one or more arcuate display segments 306-316. When content is mirrored in this fashion, casino patrons located outside EGM lounge 300 may be able to watch some of the game events that occur within EGM lounge 300, thereby increasing excitement and attracting new players to EGM lounge 300.

In some embodiments, the second set of content may also be different from the first set of content. For example, the second set of content may relate more generally to one or more game being played on EGMs 104A-104D, as described herein. For example, where a tournament game is being played by EGMs 104A-104D within EGM lounge 300, content more generally related to the tournament game (such as a tournament game theme, a tournament leaderboard, an attract mode, and the like) may be displayed on outer display 305 of overhead display 302. In one example embodiment, each outer display panel of each arcuate display segment 306-316 may display a relative tournament position of a player (e.g., on a leaderboard) on an EGM 104A-104D positioned under (or substantially under) the respective arcuate display segment 306-316. In other words, an outer display panel of an arcuate display segment 306-316 may display a relative tournament position of a player on an EGM 104A-104D positioned under, substantially under, or closest to the arcuate display segment 306-316. In another embodiment, outer display 305 may display an attract mode and/or another suitable animation or video graphic.

Thus, in various embodiments, outer display 305 may display a variety of content, some of which may the same as content displayed on inner display 303, and some of which may be different from content displayed on inner display 303. Moreover, in some embodiments, a display device may be included on an outward facing surface of EGMs 104A-104D (e.g., a surface facing outward from EGM lounge 300 and viewable by casino patrons outside EGM lounge 300). Where EGMs 104A-104D include outward facing display devices, content may also appear, as described above, to transfer, or "fly up to" and "fly down from," outer display 305 of overhead display 302. For example, content may appear to fly down from an outer display panel of an arcuate display segment 306-316 in the form of a lightning strike to an outward facing display device of an EGM 104A-104D. Although a lightning strike effect is described, it will be appreciated that a variety of animation effects may be implemented to illustrate the transfer of content from overhead display 302 to an EGM 104A-104D.

Figure 13:
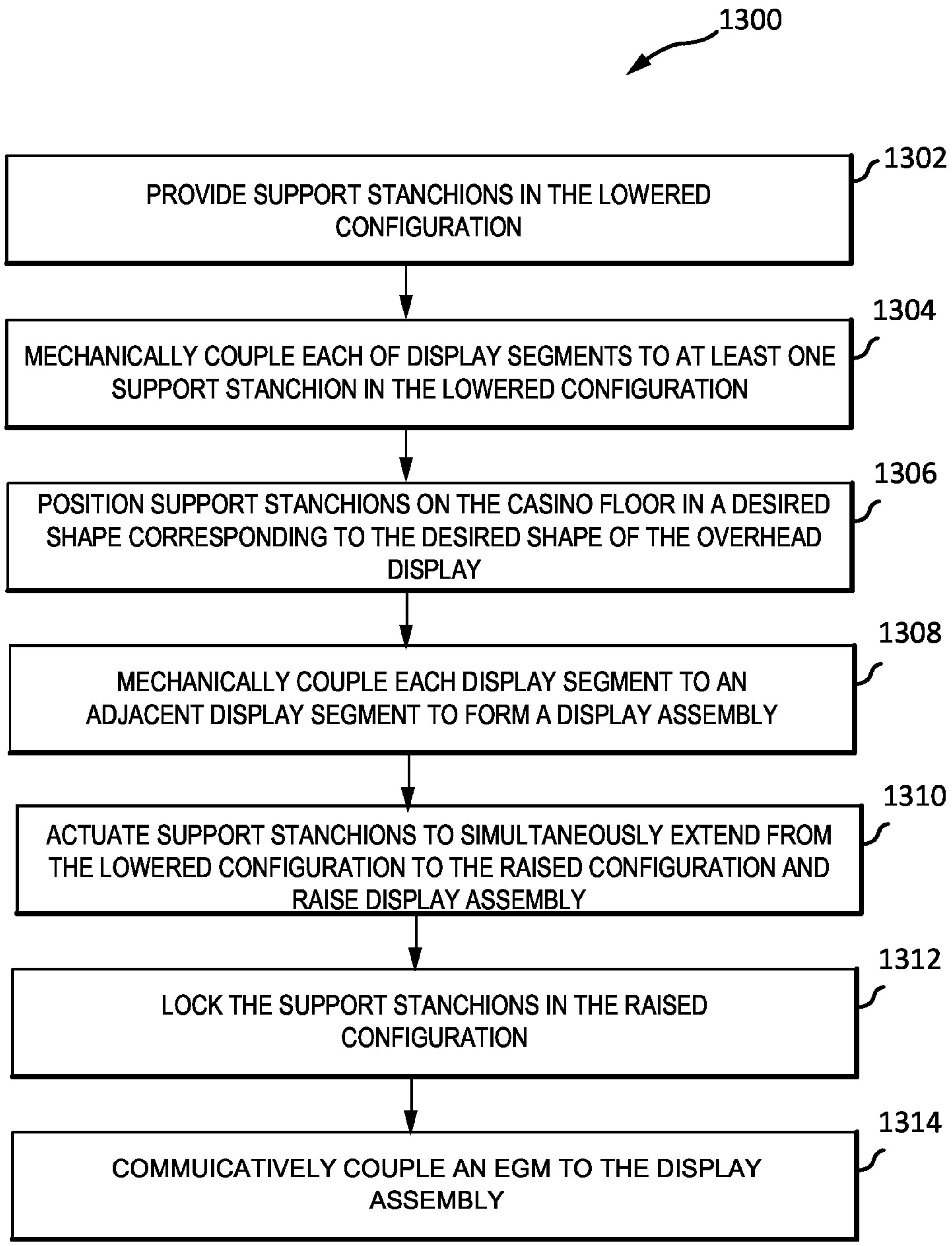
FIG. 13 is a flowchart illustrating an example process for assembling an overhead display assembly such as those shown in FIGS. 3-10.

FIG. 13 is a flowchart illustrating an example process 1300 for assembling an overhead display assembly such as those shown in FIGS. 3-10. The example process 1300 is described here as being used to assemble the overhead display 302 for the EGM lounge 300 shown in FIG. 3 and utilizing telescoping support stanchions (e.g., as stanchions 332-340). However, it should be understood that process 1300 may be used to assemble any of the display assemblies described herein.

In the example embodiment, process 1300 includes providing 1302 support stanchions 334-344 in the lowered configuration and mechanically coupling 1304 each of display segments 306-316 to at least one support stanchion 334-344. In particular, an operator may lift each display segment 306-316 onto a corresponding support stanchion 334-344 in the lowered position and secure each display segment 306-316 to the corresponding support stanchion 334-344. In other embodiments, an independent lift mechanism (e.g., a fork lift) may be provided to lift display segments 306-316 onto support stanchions 334-344. With display segments 306-316 positioned on support stanchions 334-344, the operator may fasten each display segment 306-316 to the corresponding support stanchion 334-344 for example by a bolt fastener, bracket, or any other suitable fastening means.

With each display segment 306-316 secured to a support stanchion 334-344, process 1300 further includes positioning 1306 support stanchions 334-344 on the floor level in a desired shape corresponding to the shape of the overhead display 302. For example, support stanchions 334-344 are circumferentially spaced on the casino floor and oriented upright to extend from the floor, as shown in FIG. 3. In some embodiments, process 1300 may also include fixing support stanchions 334-344 to a support structure on the floor or to the floor itself to secure support stanchions 334-344 in place. For example, in some embodiments, after support stanchions 334-344 are in the proper position on the floor, an operator may fasten support stanchions 334-344 (e.g., via one or more bolts or brackets) to the floor or support structure. In other embodiments, support stanchions 334-344 are positioned generally in the desired positions (e.g., as shown in FIG. 3) prior to coupling display segments 306-316 to support stanchions support stanchions 334-344 and may be adjusted slightly to facilitate coupling adjacent display segments 306-316.

Process 1300 also includes mechanically coupling 1308 each display segment 306-316 to an adjacent display segment 306-316 to form overhead display 302 (e.g., as shown in FIG. 3). In embodiments where display segments 306-316 include a fixed connector, mechanically coupling adjacent display segments 306-316 may also electrically couple the fixed connectors. In other embodiments, an operator may independently electrically couple adjacent display segments 306-316 to one another, either prior to, or subsequent to, mechanically coupling the adjacent display segments 306-316. In some embodiments, support stanchions 334-344 are fixed to the floor only after all display segments 306-316 are mechanically coupled to form overhead display 302.

In the example embodiment, after all display segments 306-316 are mechanically coupled, process 1300 includes actuating 1310 support stanchions 334-344 to extend from the lowered configuration to the raised configuration and raise overhead display 302. In particular, the operator may activate each actuator on support stanchions 334-344 simultaneously to extend each support stanchion 334-344 from the lowered configuration to the raised configuration in unison, such that the orientation of overhead display 302 is substantially maintained while overhead display 302 is being raised. In particular, as shown in FIG. 3, overhead display 302 is oriented such that the central axis 324 of overhead display 302 is generally perpendicular to a floor or ground level. In the example process 1300, overhead display 302 is raised on support stanchions 334-344 simultaneously such that the perpendicular orientation of the central axis 324 is maintained between the lowered configuration and the raised configuration. In some embodiments, a central controller may be provided that is operable to activate each of the actuators simultaneously to facilitate raising each of support stanchions 334-344 and display segments 306-316 in unison. In such embodiments, the actuators may be communicatively coupled to one another and/or to the central controller.

With each of support stanchions 334-344 in the raised configuration, support stanchions 334-344 are locked 1312 (e.g., via a locking mechanism as described elsewhere herein) to maintain support stanchions 334-344 in the raised configuration. After the displays are raised, at least one of display segments 306-316 is electrically coupled to an external power source that provides power to each of the display segments 306-316. The EGMs 104A-104D are then positioned in a desired shape on the floor surface beneath display segments 306-316.

Process 1300 also includes coupling 1314 at least one of EGMs 104A-104D in communication with one or more of display segments 306-316. In particular, in some embodiments, EGMs 104A-104D may each be coupled to a central server, which may be communicatively coupled to display assembly 302. In other embodiments, EGMs 104A-104D are coupled in communication with each other. In such embodiments, one of EGMs 104A-104D may include a master display controller for controlling display assembly 302 by coupling the EGM 104A-104D to display assembly 302. In further embodiments, each EGM 104A-104D is independently coupled in communication with display assembly 302 by connecting to a corresponding display segment 306-316. In some embodiments, an external memory (e.g., such as a flash drive) containing display graphics information thereon, may also be communicatively coupled to a display input port of at least one of display segments 306-316.

Thus, an overhead display configured to be mounted over a bank of electronic gaming machines is provided. The overhead display may be assembled from a plurality of arcuate display segments, where each arcuate display segment includes an inner display panel and an outer display panel spaced radially outward of the inner display panel and extending substantially coaxially with the inner display panel about a common center axis. Once assembled, the overhead display is ring-shaped and includes an inner display and an outer display formed from the plurality of arcuate display segments.

In operation, a variety of content may be provided to the inner and outer displays of the overhead display. For example, a first set of content may be provided to the inner display, and a second set of content (which may be different from or the same as the first set of content) may be provided to the outer display. In one example, content is transferred using an animation effect between one or more EGMs positioned under the overhead display and the inner and outer display panels of the overhead display to create a variety of content delivery and display effects.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An overhead display assembly comprising:

an overhead display including a plurality of display segments, each display segment of the plurality of display segments being configured to mate with at least one other display segment to form the overhead display, wherein a first display segment of the plurality of display segments includes an inner display panel on a first side of the first display segment and an outer display panel on a second, opposed side of the first display segment; and a plurality of stanchions coupled to the overhead display, the plurality of stanchions including a first stanchion attached to the first display segment, the first stanchion including a body that is extendable, with the first display segment attached to the first stanchion, between a first configuration and a second configuration to move the first display segment by the first stanchion in relation to one or more electronic gaming machines.

2. The overhead display assembly of claim 1 further comprising an actuator coupled to the first stanchion for driving the body of the first stanchion between the first configuration and the second configuration, wherein the actuator includes a mechanical actuator, an electromechanical actuator, or a mechanical and electromechanical actuator.

3. The overhead display assembly of claim 2, wherein the body of the first stanchion includes telescoping sections that are engaged with one another by a cam mechanism, the cam mechanism being configured to convert rotational movement by the actuator into linear movement of the telescoping sections.

4. The overhead display assembly of claim 3, wherein at least one of the telescoping sections is threadably engaged with a shaft coupled to the actuator.

5. The overhead display assembly of claim 1, further comprising a hydraulic actuator coupled to the first stanchion for driving the body of the first stanchion between the first configuration and the second configuration, the hydraulic actuator including a cylinder configured to be pressurized by a fluid.

6. The overhead display assembly of claim 1, wherein the plurality of stanchions further includes a second stanchion attached to a second display segment of the plurality of display segments, the second stanchion including an additional body that is extendable, with the second display segment attached to the first stanchion, and simultaneously with extension of the first stanchion, between a lowered configuration and a raised configuration.

7. The overhead display assembly of claim 1, wherein the first stanchion has a height in the first configuration, wherein the first configuration height is between 5% and 80% of the height of the first stanchion in the second configuration.

8. The overhead display assembly of claim 1, wherein the first stanchion has a height in the first configuration, wherein the first configuration height is approximately 50% of a height of the first stanchion in the second configuration.

9. The overhead display assembly of claim 1, wherein a first display segment of the plurality of display segments includes an end portion configured to mechanically couple to a second display segment of the plurality of display segment, and wherein the end portion includes an electrical connector configured to electrically couple with the second display segment.

10. An electronic gaming machine lounge comprising:

a bank of electronic gaming machines; and an overhead display assembly comprising:

an overhead display including a plurality of display segments, each display segment of the plurality of display segments being configured to mate with at least one other display segment to form the overhead display, wherein a first display segment of the plurality of display segments includes an inner display panel on a first side of the first display segment and an outer display panel on a second, opposed side of the first display segment; and a plurality of stanchions coupled to the overhead display, the plurality of stanchions including a first stanchion attached to the first display segment of the plurality of display segments, the first stanchion including a body that is extendable, with the first display segment attached to the first stanchion, between a lowered configuration and a raised configuration for raising the first display segment by the first stanchion over the bank of electronic gaming machines.

11. The electronic gaming machine lounge of claim 10, wherein the bank of electronic gaming machines comprises a first electronic gaming machine, and wherein the first display segment is positioned above and spaced from the first electronic gaming machine when the body of the first stanchion is in the raised configuration.

12. The electronic gaming machine lounge of claim 10, wherein the first stanchion includes a first end for supporting the first stanchion on a floor and an opposed second end, the first display segment being attached to the first stanchion proximate the second end.

13. The electronic gaming machine lounge of claim 10 further comprising an actuator coupled to the first stanchion for driving the body of the first stanchion between the raised configuration and the lowered configuration, wherein the actuator includes at least one of a mechanical actuator and an electromechanical actuator.

14. The electronic gaming machine lounge of claim 13, wherein the body of the first stanchion includes telescoping sections that are engaged with one another by a cam mechanism, the cam mechanism being configured to convert rotational movement by the actuator into linear movement of the telescoping sections.

15. The electronic gaming machine lounge of claim 13, wherein the body of the first stanchion includes telescoping sections and at least one of the telescoping sections is threadably engaged with a shaft coupled to the actuator.

16. A method for assembling an electronic gaming machine lounge comprising:

providing at least one electronic gaming device;

providing a plurality of display segments, each display segment of the plurality of display segments configured to mate with at least one other display segment to form an overhead display, wherein a first display segment of the plurality of display segments includes an inner display panel on a first side of the first display segment and an outer display panel on a second, opposed side of the first display segment;

coupling the overhead display to a plurality of support stanchions by attaching the first display segment to a first stanchion of the plurality of support stanchions; and extending a body of the first stanchion, after attaching the first display segment to the first stanchion, from a lowered configuration to a raised configuration to raise the first display segment over the at least one electronic gaming device.

17. The method of claim 16, wherein bodies of each support stanchion are extended simultaneously from the lowered configuration to the raised configuration to maintain an orientation of the overhead display during said extending.

18. The method of claim 16 further comprising:
- mechanically engaging the first display segment to a second display segment of the plurality of display segments; and
- electrically coupling the first display segment to the second display segment, wherein each display segment of the plurality of display segments is mechanically engaged with at least one additional display segment.

* * * * *